(12) United States Patent
Levine

(10) Patent No.: US 6,691,015 B1
(45) Date of Patent: Feb. 10, 2004

(54) VEHICLE DRIVE OVERDRIVE SYSTEM

(76) Inventor: Alfred B. Levine, 9005 Seven Locks Rd., Bethesda, MD (US) 20817

( * ) Notice: Subject to any disclaimer, the term of this patent is extended or adjusted under 35 U.S.C. 154(b) by 0 days.

(21) Appl. No.: 10/352,864

(22) Filed: Jan. 29, 2003

Related U.S. Application Data

(62) Division of application No. 10/236,988, filed on Sep. 9, 2002.
(60) Provisional application No. 60/245,587, filed on Nov. 6, 2000, and provisional application No. 60/222,592, filed on Aug. 2, 2000.

(51) Int. Cl.[7] .............................. G05D 1/02; G06F 17/00
(52) U.S. Cl. .......................... 701/70; 701/24; 180/171; 340/435; 340/905
(58) Field of Search .......................... 701/1, 23, 38, 701/37, 24, 71, 29, 93, 70; 340/435–437, 905; 180/168, 170, 171; 377/23

(56) References Cited

U.S. PATENT DOCUMENTS

| | | | |
|---|---|---|---|
| 4,090,741 A | * | 5/1978 | Rajput ........................ 303/127 |
| 4,098,542 A | * | 7/1978 | Rajput et al. .......... 303/122.02 |
| 5,318,143 A | * | 6/1994 | Parker et al. ................ 180/168 |
| 5,555,312 A | * | 9/1996 | Shima et al. ................ 382/104 |
| 5,684,490 A | * | 11/1997 | Young et al. ................... 342/70 |
| 5,765,116 A | * | 6/1998 | Wilson-Jones et al. ........ 701/41 |
| 6,014,595 A | * | 1/2000 | Kobayashi ...................... 701/1 |
| 6,058,340 A | * | 5/2000 | Uchiyama et al. ............. 701/37 |
| 6,130,928 A | * | 10/2000 | Jamzadeh et al. ............. 377/23 |
| 6,223,125 B1 | * | 4/2001 | Hall ........................... 701/301 |

* cited by examiner

Primary Examiner—William A Cuchlinski, Jr.
Assistant Examiner—Ronnie Mancho

(57) ABSTRACT

An electronic subsystem for automotive vehicles for overriding the manual control of the vehicles and substituting limited automatic control in response to onboard sensors detecting external and internal conditions that are in violation of the traffic laws or adverse to the normal manually controlled operation of the vehicle. Traffic laws and regulations are digitally detected from the vehicle by wireless acquisition, and the vehicle is automatically controlled to insure compliance. The system detects adverse environmental conditions, including degraded traction and visibility, proximity of other vehicles and objects, uncontrolled vehicle movements, including skidding and fishtailing, and others, and overrides the manual control of the vehicle to minimize the effects of such conditions. The system also provides for monitoring traffic flow along roadways and wirelessly regulating such flow.

11 Claims, 5 Drawing Sheets

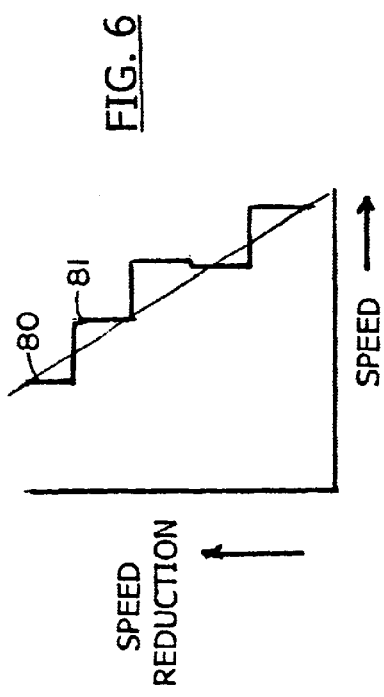
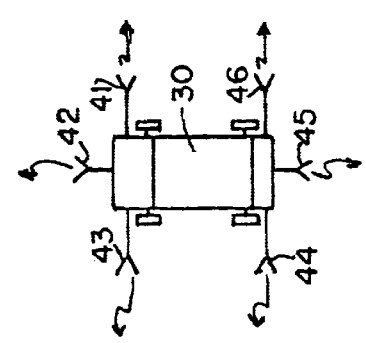
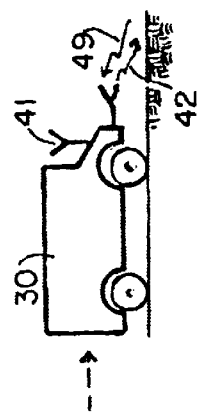
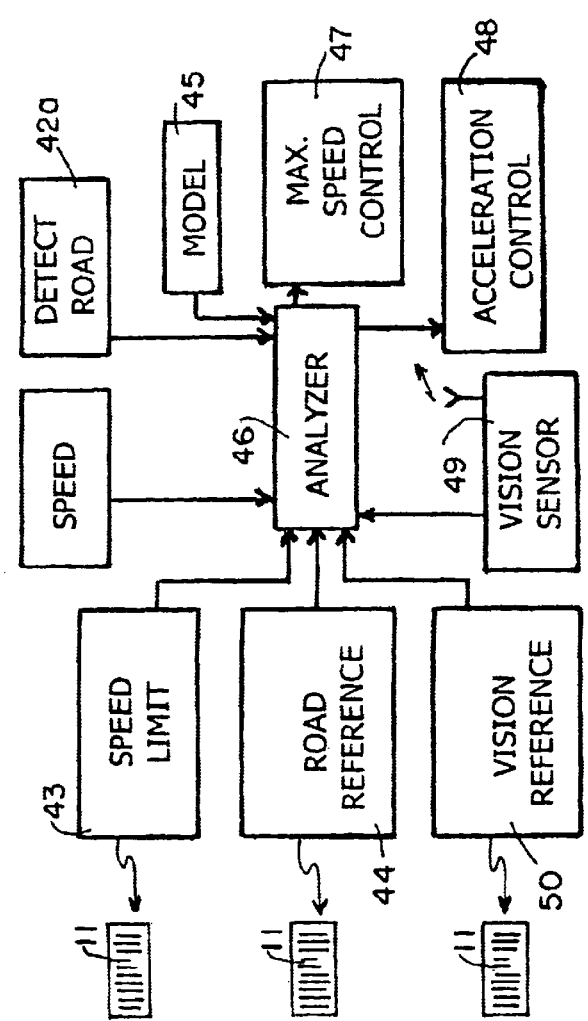

VEHICLE DRIVE OVERDRIVE SYSTEM

This application is a division of Ser. No. 10/236,988 filed Sep. 9, 2002.

This application claims the benefit of Provisional applications No. 60/222,592, filed Aug. 2, 2000 and No. 60/245,587, filed Nov. 6, 2000.

This invention generally relates to hybrid automotive control systems, and more particularly to such systems permitting driver manual control of the vehicle but providing automatic override of certain functions of control of the vehicle as is necessary to comply with traffic laws and to compensate for various external conditions of danger.

BACKGROUND

With over 220 million automobiles in use in the U.S., and more being added daily, it has become essential to provide some degree of limited override over complete manual control of the vehicles by drivers to insure compliance with the traffic laws, and to protect drivers and passengers from various dangerous conditions, such as adverse weather, driver error and fault, adverse road conditions, and improperly driven other vehicles. Adverse weather conditions such as ice, rain, sleet, snow, and fog require reduced driving speeds and reduced rates of acceleration and braking of the vehicles to proceed with safety. Similarly, drivers that are reckless and overly aggressive endanger others, as do drivers that are physically impaired, or impaired by the use of alcohol and drugs that reduce hand-eye coordination. Uncontrolled movements of the vehicles resulting from skidding, fishtailing, sliding, and rolling also require correction by slower speeds, and reduce rates of acceleration and braking. Obstacles in the roads, or oncoming vehicles in the path of a vehicle going forwardly or backwardly need to be avoided. For all of these reasons, and others, there exists a need for partially overriding the manual control of automotive vehicles with temporary and limited automatic controls in circumstances where such conditions exist.

SUMMARY OF INVENTION

According to the present invention there is provided a hybrid control system for automatic vehicles that supplements, assists, and overrides the manually operated driver controls where required by traffic laws or by adverse circumstances that present a danger to the driver and to the other vehicle occupants. The system includes a plurality of sensors that detect the traffic laws and regulations as the vehicle proceeds from location to location, as well as detecting various movements and conditions of the vehicle in relation to the roadway, and to other vehicles, and to the surrounding environment, to automatically override the manual controls and take over the control of the vehicle on a temporary basis, and in a limited manner as is required for safety purposes. Among others, the sensors detect the tractive condition of the road with respect to the vehicle, as well as the driver's vision of the surroundings, such as at nighttime, or during periods of rain, snow, sleet, or fog. These detected conditions are employed to automatically reduce the maximum speed of the vehicle below the prevalent speed limit, and to reduce the ability of the vehicle to accelerate below that normally provided by the vehicle. This partial overriding of the driver's normally available maximum speed limit and limitation of its acceleration rate are provided to bring the vehicle operation into compliance with the traffic laws, and to better compensate for the adverse conditions detected by the various sensors.

BRIEF DESCRIPTION OF THE DRAWINGS

FIG. 3 and FIG. 3a illustrate various directional movements of vehicles at intersecting roads, and in FIG. 3a the sensors on the vehicle used during at such intersection, FIG. 4 is a side view of a vehicle illustrating the operation of other vehicle sensors, and FIG. 4a shows a block diagram of an electrical subsystem using the sensors of FIG. 4, FIG. 6 is a plotted chart illustrating the extent of reduction of the maximum vehicle speed in response to the signals from the sensors.

DETAILED DESCRIPTION OF PREFERRED EMBODIMENTS

Figure 1:
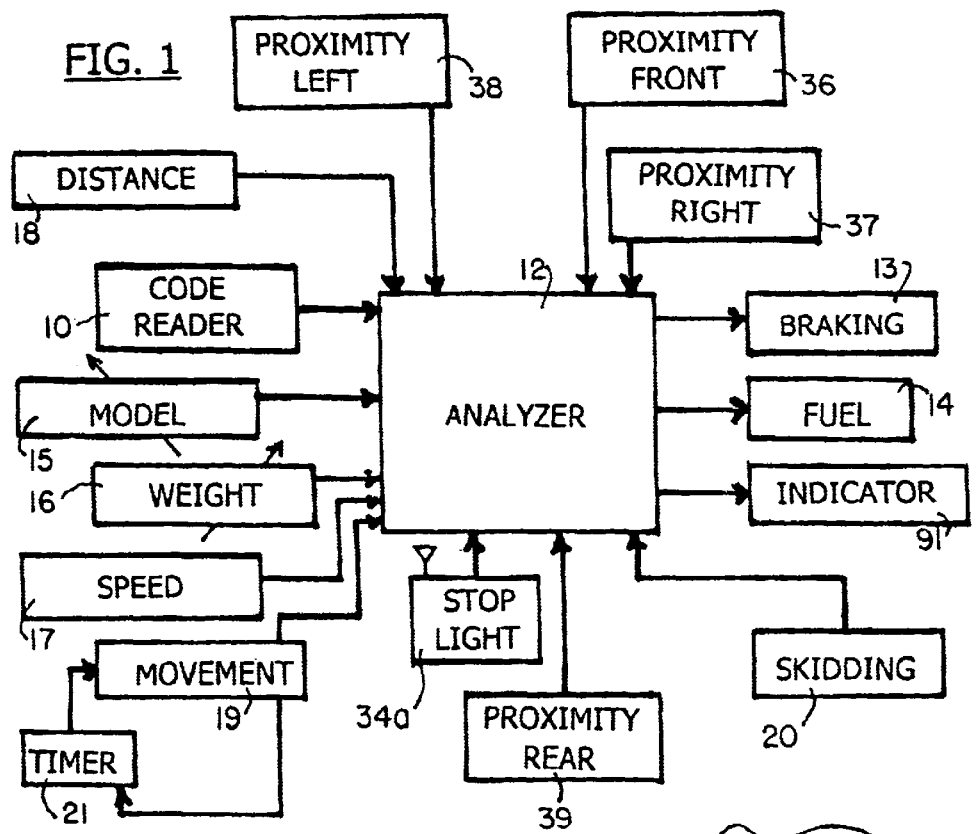
FIG. 1 is an electrical block diagram showing one preferred embodiment of the invention.
Figure 2:
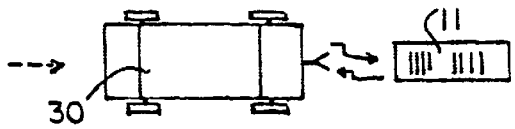
FIG. 2 is a plan view of a vehicle and illustrating the remote sensing of digital codes on or near the roadway.

Referring to the drawings. There is shown in FIG. 1, a preferred system for overriding the vehicle manual control by the driver and automatically stopping a vehicle at the next road or street intersection in response to an onboard reader in the vehicle detecting a bar coded "stop" street sign provided by the traffic control authorities. As shown, the system includes a code reader 10 on board the vehicle for remotely reading the content of a coded sign 11 (FIG. 2) that may be embedded in the roadway or positioned alongside the roadway in the same manner as conventional traffic control signs that are visibly readable by passing drivers. Upon reading the sign 11, the reader 10 sends a stop command signal to the onboard system analyzer 12 that, in turn, sends an overriding signal to control the braking subsystem 13 and the fuel control subsystem 14 for the vehicle. The degree of braking and fuel control required to stop the vehicle at the next intersection is a function of the type of vehicle and its characteristics; its speed when receiving the braking command, and the distance to the next intersection when receiving the stop command generated by analyzer 12. Where the bar coded stop signs 11 are always located at the same fixed distance from the next intersection, only the vehicle speed and its stopping characteristics need be entered into the analyzer 12 to control the stopping of the vehicle as required. The vehicle speed signal is obtained from a transducer 17 coupled to the vehicle speedometer (not shown), and the stopping characteristics for the vehicle (e.g. model type, weight etc.) are obtained from the manufacturers specifications and an adjustable signal is entered into the system at 15 when the system is first installed in the vehicle. Thus the analyzer 12 responds to the stop command upon the reader 10 reading the bar coded street stop sign 11, and the system overrides the manual control of the vehicle driver to brake the vehicle and reduce its fuel flow, both as needed, to bring the vehicle to a stop at the next intersection. In the event that the vehicle is not brought to a full stop at the next intersection due to poor roadway or other conditions (ie ice, sleet, snow, worn tires etc.) the continued forward movement of the vehicle is detected by a motion sensor 19 to generate an added increment of stopping command signal to the analyzer 12 to bring the vehicle to a complete stop. The motion or movement sensor 19 also triggers the operation of a timer circuit 21 upon the vehicle becoming fully stopped, and after a predetermined short interval, the timer circuit 21 resets the components of FIG. 1 to their initial condition in preparation for receiving a subsequent command from the code reader 10.

Thus the subsystem receives commands from coded road signs 11 to stop and in response to such commands overrides the manual control of the vehicle to apply sufficient braking and reduce fuel to the engine as is necessary to bring the vehicle to a stop at the next intersection, taking into account the type of vehicle, its braking characteristics, and its speed when receiving the stop command signal. Additionally, where the vehicle fails to fully stop, due to poor brakes, worn tires, slippery roads, etc., the subsystem responds by applying further braking and fuel control as needed. A timer 21 thereafter permits the overriding subsystem to discontinue operation after a short time interval, permitting the driver to regain manual drive control of the vehicle. As shown, the timer 21 is energized by a vehicle movement sensor 19 to function after a complete stopping of the vehicle, and then to reset the subsystem to regain manual control of the vehicle. According to the invention, the driver may manually apply additional braking to the vehicle even during the override period, since it may be necessary to stop the vehicle before reaching the intersection for other reasons.

Speed Limit Control

According to the invention, the subsystem also automatically overrides complete manual control of the vehicle to the limited extent necessary to prevent speeding of the vehicle beyond the speed limit established by the traffic laws. Referring again to FIG. 1, the prevailing speed limit for each section of the street or road is identified in bar coded form on the street or road sign 11 for that section of the road. This code is read by the onboard reader 10, as the vehicle passes that road sign 11 and a speed limit signal corresponding to the code on the sign 11 is also directed to the analyzer 12. The existing speed of the vehicle is available from the conventional speedometer and a signal from the speedometer is transduced at 17 and directed to the analyzer 12 for comparison with the speed limit signal from the code reader 10. Where the existing speed of the vehicle exceeds the posted speed limit, the analyzer 12 energizes the brake control 13 and the fuel control 14 to override the manual control of the vehicle and automatically reduce its speed to the posted speed limit. However, since it is occasionally necessary for the vehicle to temporarily exceed the speed limit to avoid an obstacle in the road, or to pass another vehicle, or for other necessary reason, the coded road sign 11 may record a speed limit that is 5 mph greater than the actual speed limit (for cities and developed areas) and that is 10 mph greater than the speed limit outside of such city areas. Thus according to the invention, the speed limit for each section of the road is identified by a coded road sign 11, and this information is read by a remote code reader 10 on board the vehicle as the vehicle passes each such sign 11. The actual speed of the vehicle is sensed at 17 and compared with the posted speed limit, and if the vehicle speed is found to exceed the speed limit, the subsystem overrides the manual control of the vehicle to automatically reduce its maximum speed to conform with the posted speed limit. After the vehicle maximum speed has been reduced and regulated to that required by the traffic law, the override of the vehicle braking and fuel control is discontinued and driver controlled manual operation of the vehicle is restored.

Intersection Control

At present over 64 million automobile crashes occur yearly in the U.S., and 90% of such crashes result from driver error, either intentionally or unintentionally. Half of such crashes occur at nighttime, and many of the remaining crashes occur when driver vision of the road and objects on the road are obscured.

According to the present invention, there is provided onboard sensors for detecting the proximity of other vehicles and objects located near a vehicle and, in response thereto, overriding the manual control of the vehicle to a limited extent to inhibit, or reduce the possibility of collision between the vehicle and such other vehicles or objects that have been detected.

Figure 3:
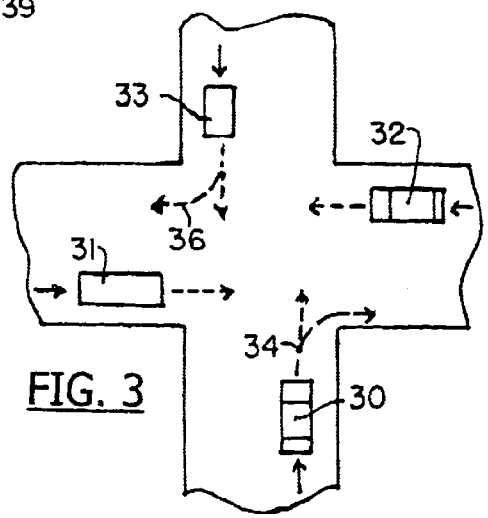

Referring to the drawings, there is shown in FIG. 3, an intersection of two roads or streets, with vehicles 30, 31, 32, and 33 proceeding along paths on each street and providing the possibility of collisions between various ones of such vehicles. As shown, the vehicle 30 proceeding along path 34 through the intersection may cross the path of travel of either vehicle 31 or 32 proceeding through the intersection in a direction transverse to that of vehicle 30. Similarly if vehicle 30 makes a left turn at the intersection it also crosses the path of the vehicles 31 and 32, as well as cutting in front of oncoming vehicle 33. On the other hand, if vehicle 30 makes a right hand turn at the intersection, it intrudes ahead of oncoming vehicle 31, as shown. Accordingly whenever a vehicle enters into an intersection of two roads, it risks a collision with other vehicles entering the intersection on the same road toward that vehicle, or entering the intersection from roads transverse to the road of that vehicle.

According to the invention, the possibility of such collisions is minimized by providing onboard proximity detectors that sense other vehicles and objects at the sides, front, and rear of the vehicle 30, that function in the system to prevent or limit movement of the vehicle into a roadway intersection in the path of such other vehicles, until the danger of collision is diminished. Referring to FIG. 3a, vehicle 30 is provided with three directionally oriented proximity detectors 44, 45, and 46, located at the rear of the vehicle and three directionally oriented proximity detectors 41, 42, and 43 located at the front end of vehicle 30. The front detector 43 and the rear detector 44 sense the proximity and approach of vehicles to the left, the front detector 41 and rear detector 46 sense the nearby presence or approach of vehicles to the right; and the front and back detectors 42 and 45, respectively, sense the presence of vehicles ahead or behind the vehicle 30. Thus this combination of directionally sensitive detectors 41 to 46, inclusive, sense the presence or approach of other vehicles into the street intersection in any direction toward the vehicle 30. As shown in FIG. 1, the signals from left hand detectors 43 and 44 are generated by transducer 38 to the analyzer 12; those from right side detectors 41 and 46 are generated by transducer 37 to the analyzer 12; and those from forward and rear detectors 42 and 45, are generated by transducers 36 and 39, respectively, to the analyzer 12. Thus as the vehicle 30 enters a road intersection various of the directionally oriented detectors sense the presence or approach of other nearby vehicles and, in response to such detection, control the vehicle's brakes and fuel control to prevent the vehicle from proceeding into the intersection in a direction that might conflict with the approach of such other vehicle(s).

In brief, the system prevents or minimizes intersection crashes between vehicles by employing proximity detectors to sense the presence or approach of such other vehicles, and in response, inhibiting the movement of the vehicle in the paths of such other vehicles or objects. As noted above, half of all car collisions in the U.S. occur at street and road intersections, with a greater percentage of such crashes occurring at nighttime or when the vision of the drivers is diminished or reduced by adverse weather or other condition.

Road Traction-speed Control

Where the traction provided by a vehicle's tires on the road is diminished due to adverse weather or other condition, there is a need for reducing the vehicle's speed and rate of acceleration for safety of the vehicle, such as to prevent skidding at curves and to permit stopping of the vehicle within required distances should that become necessary. Many drivers continue to drive at the same speeds and accelerate despite the fact that the road may provide reduced traction due to rain, snow, sleet, and ice. As a result, their vehicles skid in an uncontrolled manner when the road curves or when the brakes are applied to slow down or stop the vehicle. Similarly where the road surface has an oil slick, moisture or ice, or contains patches of sand or gravel deposits, or is broken in sections, or contains potholes; loss of tire traction can also result creating uncontrolled dangerous skidding, fishtailing, or other undesired movements of the vehicle resulting in full or partial loss of control of the vehicle. According to the present invention, there is provided one or more sensors for detecting the surface condition of the road ahead of the vehicle to determine if the tire-road traction is reduced. If such condition is found to exist, then the system override the manual control of the vehicle to the extent of reducing its maximum speed and its rate of acceleration to a level that is safer for driving under the detected conditions.

Referring to FIGS. 4, an automotive vehicle 30 is illustrated that is provided with a wireless sensor 42 for detecting the surface of the road ahead of the vehicle 30. The sensor 42 may pivot to scan the road from side to side, or a transverse array of fixed sensors (not shown) may be used to provide the same function. Where an active sensor 42 is used it may be located underneath the vehicle to project an infrared beam to the pavement and receive a reflected beam whose intensity corresponds to the reflectivety, or degree of smoothness, of the road surface. As shown in FIG. 4a, a transduced signal from this sensor 42 is generated at 42A and compared to a reference signal generated by a code reader 44 that scans a digitally coded sign 11 in the roadway. Since the reflectivety of the roads vary depending upon the road material, (such as asphalt composition, cement, or other material), the reference signal from reader 44 is necessary for comparison to determine whether the surface condition of the road is degraded over normal "dry" conditions, and the extent of the degradation in traction. For example, a wet pavement that is coated with rain, snow, sleet, or ice, or that is covered with patches of oil slick, gravel, or other material, provides a reduced reflectivety to a radiant beam of infrared, or other light.

According to the invention, the maximum speed and rate of acceleration of the vehicle are also proportionally regulated according to the existing vehicle speed, and according to the speed limit permitted by traffic regulations on that section of the road. A signal relating to the existing speed is entered into the analyzer 46 by speed sensor 17, and the speed limit requirement is obtained by onboard sensor 43 reading this information from the coded road sign 11. Still further, the override mechanism is also modified according to the manufacturers specifications for the vehicle, and a signal for this parameter is produced by adjustable generator 45, that is adjusted at the time of installation of the subsystem in the vehicle.

Briefly recapitulating the operation and functioning of this subsystem, upon detecting a condition of reduced traction in the roadway that might present a danger under the normal manually controlled operation of the vehicle, the subsystem responds to a number of variable detected conditions including the vehicles speed, the prevalent speed limit, the type and characteristics of the vehicle, and the degree of reduction of the traction of the vehicle with the roadway over "normal" conditions. All of these detected conditions are entered into the analyzer 46, and the vehicle drive controls are overridden by these entered parameters to proportionally limit the maximum speed of the vehicle and its rate of acceleration. Where the reduced traction of the vehicle is detected on a high speed highway, and the vehicle is traveling at a high speed, the reduction in maximum speed and acceleration rate is made greater by the override controls than when the vehicle is proceeding at a reduced speed and in a limited speed zone, such as a city street. The vehicle road sensor 42a (FIG. 4a) may be provided in the form of a scanner (not shown) to scan sections of the road to the right and left ahead of the vehicle 30 as well as scanning different distances ahead of the vehicle. This enables the subsystem to determine whether the reduced traction occurs only in discontinuous patches (e.g. oil slicks) along the road or whether the slippery condition is extended in a continual or continuous manner (e.g. by rain, sleet, or ice formations).

As discussed, the degree of override regulation is also controlled according to the type of vehicle set forth in manufacturer's specifications, since four wheel drive vehicles, front wheel drive, sport suspension equipped vehicles, and other types, all have different handling and response characteristics that vary from other vehicles in response to changes in traction of the road. The traction characteristics of the road also vary considerably depending upon the road materials and its age and integrity. This information is provided by the coded road signs 11 that are read by a sensor 44 on the passing vehicles, and this signal is applied as a reference signal to the analyzer 46 as shown in FIG. 4a.

Briefly recapitulating the above, the surface condition of the road is scanned by an onboard sensor 42a of passing vehicles, and a corresponding signal is applied to analyzer 46. This roadway signal from 42a is compared with a road reference signal from bar code reader 44 obtained from reading a road sign 11, to determine any changes in the road surface that are present due to weather or other adverse conditions. The existing speed of the vehicle is also added from generator 17 to modify the degree of override control of the vehicle, as is the model and type of vehicle added by generator signal 45. All of these signals are applied to analyzer 46 that determines a loss of traction condition of the vehicle, as adjusted by the other parameters, to proportionally regulate the maximum speed of the vehicle and its rate of acceleration to compensate for the detected reduced traction of the vehicle.

Driver Vision

Many more car crashes and accidents occur during the night hours and when the vision of drivers is diminished or obscured by fog, rain, snow, sleet, or air pollution; all of which limit the vision of the drivers. According to the invention, driver visibility through the surrounding air is detected by sensor(s) onboard of the vehicle, and upon detection of a sufficiently degraded condition, the manually operated control of the vehicle is partially overridden to the extent of limiting the maximum speed of the vehicle and its rate of acceleration to compensate for this impaired vision condition.

Referring again to FIG. 4a, the vehicle 30 is provided with a wireless vision sensor 49 that scans a received infrared beam whose intensity is representative of the degree of visibility ahead of the vehicle 30. This sensor signal from 49 is directed to the analyzer 46 that compares this signal with a visibility reference signal from generator 50 that is also applied to analyzer 46. The reference vision signal from 50 is obtained for each different location of the vehicle by remotely reading the content of a coded road sign 11 at each such different location. The reference signals are representative of the visibility at such different locations during normal daylight hours and in the absence of fog, rain, snow, sleet, or air pollution. The analyzer 46 responds to the difference between such signals from 49 and 50 to detect the degree of impaired vision over ambient conditions to thereupon override the manually controlled operation of the vehicle to the extent of proportionally reducing its maximum speed and its rate of acceleration and provide compensation for the impaired vision condition. As noted above, the extent of reduction in maximum speed and rate of acceleration is regulated in proportion to the extent of impaired visibility ahead of the vehicle 30. Additionally, since the analyzer 46 is also energized by the traction signals from sensor 42a, reference sensor 44, speed sensor 17, and speed limit sensor 43, the override controls may be further regulated to take into account the reduced traction of the road, the vehicle speed, and other conditions discussed above. Thus, for example, where the driver's vision is reduced concurrently with reduced traction with the road, (such as during an ice storm or heavy snow storm) the maximum speed of the vehicle and its rate of acceleration are further proportionally reduced to compensate for these multiple adverse conditions.

Briefly recapitulating the structure and operation of the controls shown in FIG. 4a, sensors 42a and 49, onboard of the vehicle, detect the surface condition of the road ahead of the vehicle and detect the visibility of the atmosphere ahead of the vehicle, respectively. Each of these detected conditions is compared with a reference condition setting forth "good traction" of the road and "good vision" through the atmosphere, (e.g. reference generators 44 and 50). These reference conditions are identified for each different roadway location by one or more coded road signs 11, and their content is detected by the wireless onboard readers 44 and 50. Where either, or both, the traction condition of the road and/or the atmospheric vision is sufficiently reduced, the manual control of the vehicle is overridden to the extent of proportionally reducing the vehicle maximum speed and its rate of acceleration to compensate for the detected adverse conditions. The overriding control also takes into account the type and model of the vehicle, its existing speed of the vehicle, and the posted speed limit for that section of the road.

Skidding-fishtailing-tilt-rollover

Reduction or loss of road traction can result in any of these uncontrolled movements. Skidding, for example can result from loss of traction, excess speed around curves in the road, braking on a broken highway, accelerating on a slippery road, or for a number of other vehicle movements under adverse conditions. Fishtailing of the vehicle as well as tilt or rollover often results from too sharp a turn, or abruptly braking the vehicle for sudden stops. Any of such uncontrolled movements can result in car crashes or collisions with other vehicles or objects, thereby endangering and injuring the vehicle occupants and destroying properties. According to the present invention, these uncontrolled movements are detected by onboard sensors in the vehicle, and the manual operation of the vehicle in response to such detected conditions is automatically overridden in a limited manner to reduce the maximum speed of the vehicle and reduce its rate of acceleration, both thereby lessening the conditions that can result in such uncontrolled movements of the vehicle.

Figure 5:
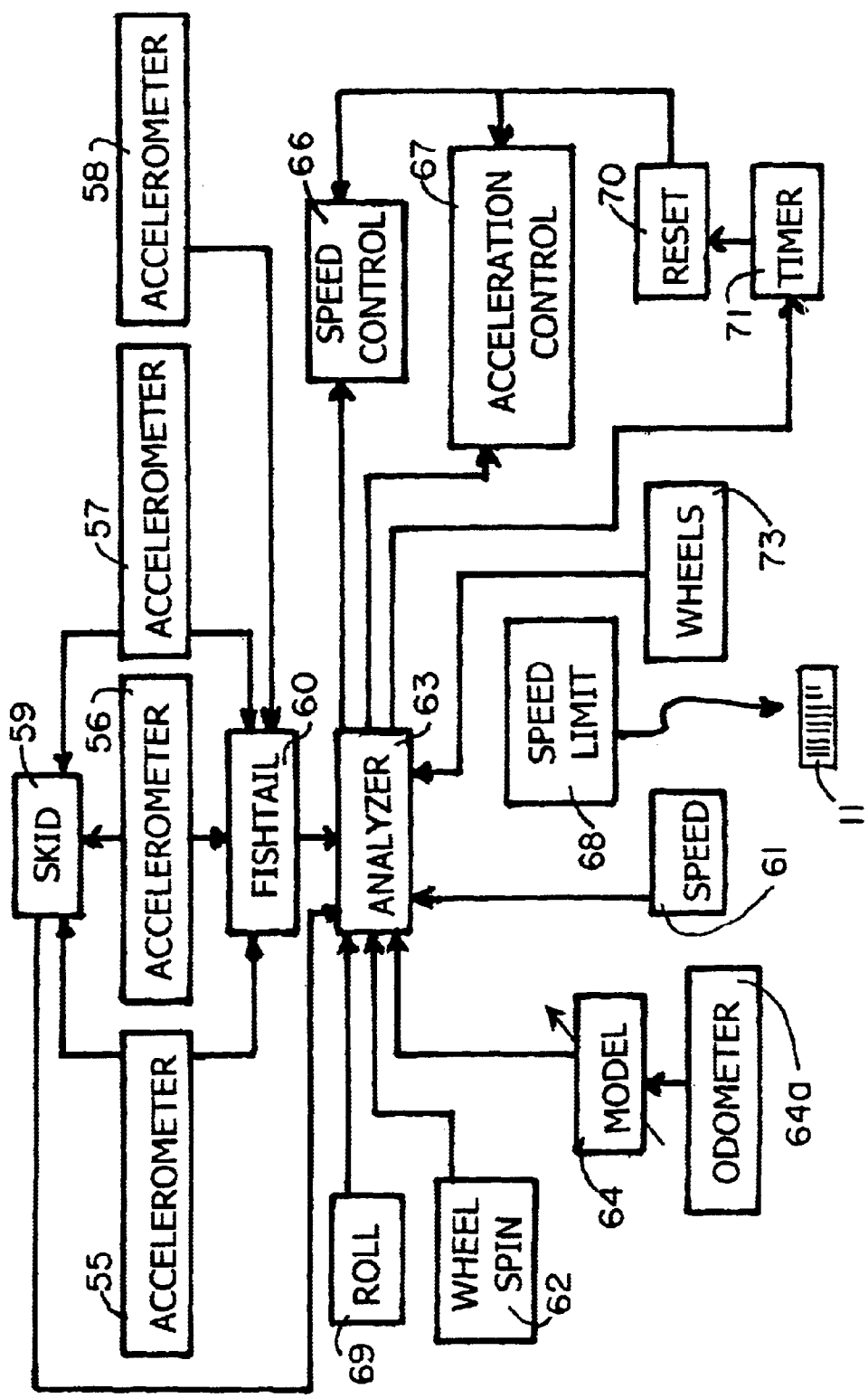
FIG. 5 is a block diagram illustrating the sensors, and a preferred system responding to uncontrolled movements of the vehicle.

FIG. 5 illustrates one preferred subsystem for detecting such uncontrolled movements, and automatically reducing the vehicle maximum speed and rate of acceleration to restore vehicle traction with the road and minimize uncontrolled movements of the vehicle. As shown, the vehicle is provided with directionally oriented accelerometers 55, 56, 57, 58, and 69, each sensing accelerational movements of the vehicle in a different direction, as shown by the arrowed lines in the drawing above each accelerometer. Whenever skidding of the vehicle occurs in any direction, one or more of these accelerometers 55 to 58 detects this uncontrolled movement to energize the skid responsive circuit 59, which, in turn, energizes the subsystem analyzer 63. Fishtailing of the vehicle results in oscillation of the various ones of the accelerometers 55 to 58, to energize the fishtail responsive circuit 60, that, in turn, energizes the subsystem analyzer circuit 63. These oscillatory fishtail signals are blocked from the skid circuit by one way diodes from the accelerometers 55 to 58 in the lines leading to the skid circuit 59, as shown, to distinguish the detected fishtailing movements from the skidding movements of the vehicle. When subsided for a fixed period of time, the analyzer 63 is reset by the resetting circuit 70, in response to timer 71, to enable complete manual control of the vehicle to be restored.

Briefly recapitulating the operation of the subsystem as described above, various uncontrolled movements of the vehicle are detected by onboard sensors indicating a reduction or loss of road traction and/or stability, and the subsystem responds to such detected movements by reducing the maximum speed of the vehicle and its rate of acceleration to enable safer operation to be restored. The reduction in speed and acceleration takes into account the various characteristics of the vehicle and its changes with aging and use; the maximum speed limit imposed by the traffic laws; and the existing speed of the vehicle when such uncontrolled movements are detected. When the uncontrolled movements are detected to subside for a period of time, the subsystem is reset to restore complete manual control of the vehicle, except when not in compliance with the traffic laws and regulations as discussed above.

Audible Reminder

Many careful drivers are occasionally inattentive to traffic conditions, or are variously impaired due to poor vision, impaired reflexes, or for other reason. To assist such drivers, and others, the present invention provides an onboard reminder subsystem that responds to the various conditions detected by the vehicle sensors, discussed above, to alert and remind the vehicle drivers of the detected conditions needing attention. This subsystem may be provided as a supplement to the automatic vehicle override subsystems discussed above, or as a separate subsystem for this purpose.

Figure 7:
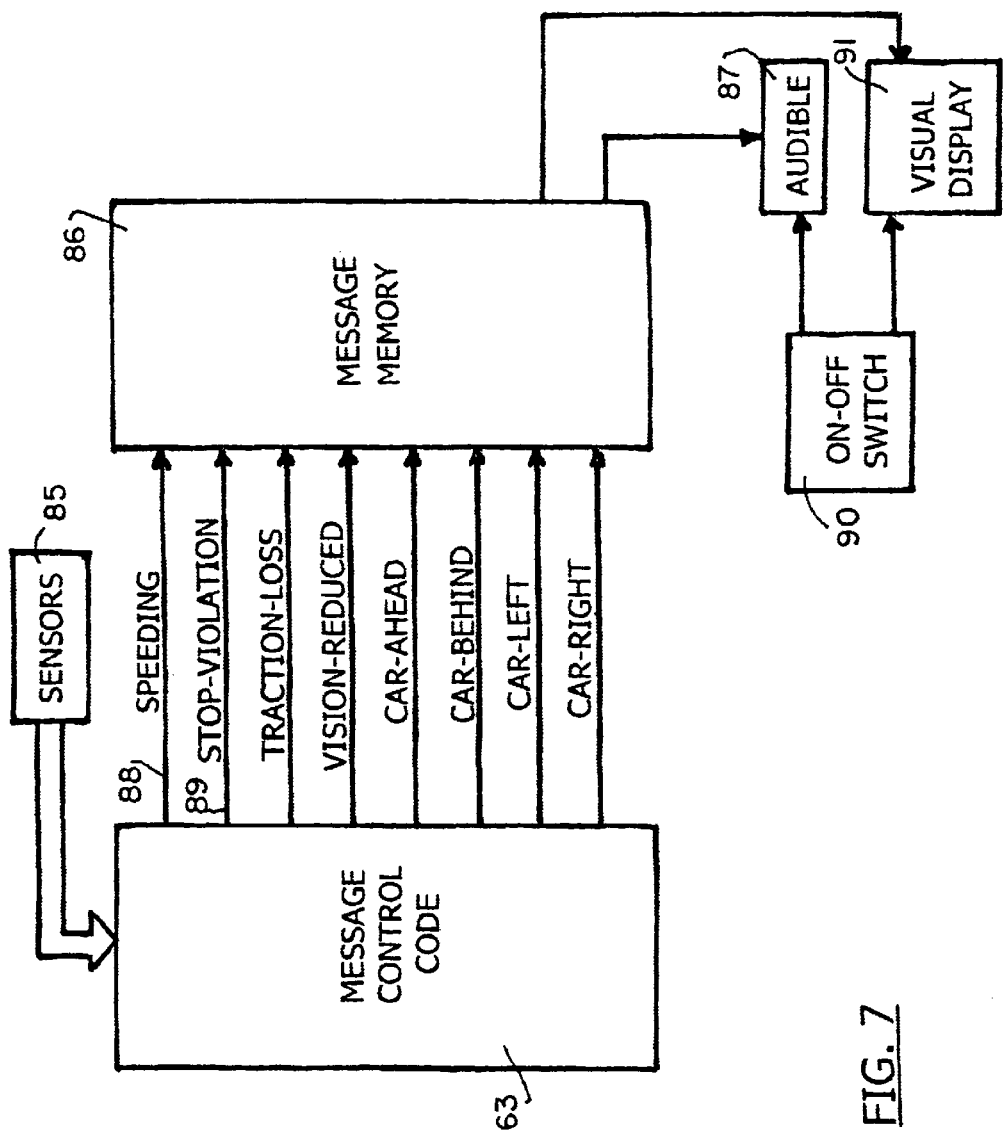
FIG. 7 is an electrical block diagram showing a supplementary embodiment, and FIG. 8 schematically illustrates supplementary traffic monitoring and control according to the invention.

Referring to FIG. 7, the plurality of sensors discussed above, and shown in FIGS. 1, 4a, and 5 are collectively illustrated as included within the block 85 in the block diagram shown. Each of the signals from the various sensors 85 are separately directed in a cable to a message control code circuit 63 that generates a different address code in response to receiving a signal from each different sensor.

The different address codes are, in turn, directed over one or more of the lines 88, 89 etc. to a message memory 86, and each different address code is applied to download a different message that has been prestored in the message memory 86. Thus, for example, when the sensors (10 and 17—FIG. 1) detect that the vehicle has violated the speed limit, the address code generated by the message control code circuit 63 downloads the message memory 86 to generate a prerecorded message notifying the driver of such violation. The prerecorded messages downloaded from the message memory 86 are, in turn, directed to a visual display 91 within the vehicle and also to an audible announcer 87 within the vehicle, thereby to both visually and audibly alert the vehicle occupants of the speeding violation that has been detected. Similarly, in the event that the vehicle passes a street stop sign and fails to stop at such sign, this is detected by sensors 10 and 19 (FIG. 1) and a different address code is directed over line 89 from the message control code circuit 63 to download a different prerecorded message from memory 86, thereby reminding the driver and occupants of the vehicle of this different violation of the traffic laws. Since this alerting and reminder system may not be necessary to those drivers that are always careful, an onboard switch 90 may be provided to disconnect one or both of the audible announcer 87 or the visual display 91.

Briefly recapitulating the functioning and operations of the alerting and reminder subsystem described above, the signals from the various onboard sensors on the vehicle, that detect the various conditions applicable to that vehicle, are directed to a message control code circuit 63 that generates a different memory address code in response to energization by each one or ones of the different sensors. The generated memory addresses are applied to a message memory 86 containing a number of prestored messages each related to a different condition detected by a different one or ones of the sensors. Each received memory address code downloads memory 86 to generate the corresponding message, and such message is directed to one or both of an audible announcer 87 and a visual display 91 within the vehicle to alert and remind the driver and other occupants of the detected condition or conditions.

Remote Traffic Control

An excess of traffic flow at rush hours, or at other times results in delays, stop and go movements of vehicles, and gridlock. Impatient drivers and reckless drivers exacerbate the delays by frequently accelerating, and changing lanes to go around other vehicles, often resulting in car crashes and accidents that further immobilize the flow of traffic in one or more lanes. According to the invention there is provided a subsystem for enabling the traffic control authorities to detect areas or pockets of congestion on the highways, caused by heavy traffic and related conditions, and in response, remotely control the vehicles traveling in such congested areas to slow down and reduce their rate of acceleration, thereby to relieve or minimize traffic congestion and slowdown.

Figure 8:
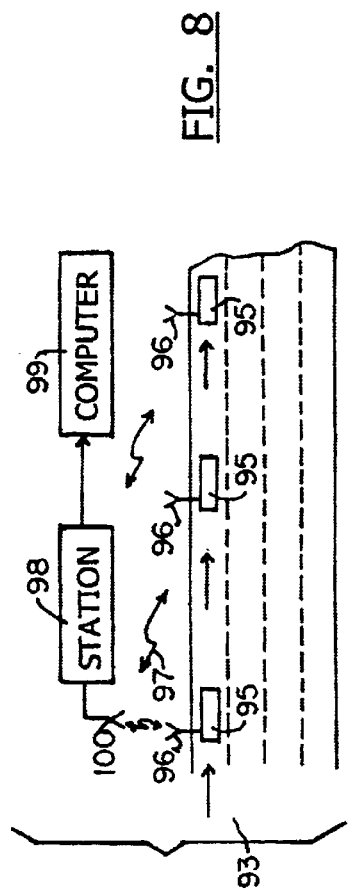

Referring to FIG. 8, each automotive vehicle 95 proceeding along a highway 93 is provided with a wireless transmitter-receiver unit 96 that continually generates a low power wireless beacon signal 97, emitted omnidirectionally from each of the vehicles 95. The beacon signals 97 from the vehicles 95 are received along each section of the highway by a computerized substation 98 maintained at spaced apart intervals by the local traffic authorities. These received beacon signals 97 are analyzed by the substation computers 99 to determine the traffic flow and rate of flow of the vehicles 95 and detect any stoppage of automotive traffic along that section of the highway. Where the traffic is found to be overly congested, slowed down, or stopped, the substation 98 transmits a wireless command signal from its transmitter-receivers 100 to all of the vehicles 95 traveling along that congested section of the highway 93. This command signal from 100 is received by the vehicles onboard electronic control subsystem, as discussed above, and the vehicle subsystems override the manual control of the vehicles 95 to the extent of reducing the maximum speed of all the vehicles in the affected areas and their rate of acceleration, thereby inhibiting such vehicles from rapid accelerations, high speed travel, and abrupt lane changes, and assisting in an orderly and regulated flow of traffic. As a result, the vehicles 95 are required to comply with more reasonable driving practices at times of high vehicle density and congestion along the highways, thereby promoting a more regularized, free flow of traffic under such conditions.

The continually generated beacon signals 97 generated by the vehicles 95 may be differently modulated for each different vehicle 95 to enable individual vehicles to be tracked by the different traffic control substations 98 as such detected vehicles travel along the highway 93. For example, each vehicle beacon signal 97 may be digitally modulated according to that vehicle's license number, thereby enabling the identification of improperly driven vehicles and the tracking of such vehicles by the authorities to insure compliance with the traffic laws. However, for the purpose of only monitoring and controlling a continuing traffic flow of vehicles, as described above, the different modulation of the signals from the different vehicles is not necessary.

Automotive vehicles can be tracked (by location, speed, and direction of travel) by triangulating on the radio emissions generated by portable cell phones in use by occupants within such vehicles. This tracking can be used to assist drivers and other occupants that are involved in troubled circumstances, and that dial a universal 911 phone number for help. According to the present invention, the wireless transmissions from such cell phones can also be detected and used to monitor the flow of traffic as discussed above, enabling the traffic control substations 98 to monitor traffic flow along highways, and/or override the manual control of the vehicles to the extent of limiting their maximum speed and rate of acceleration to reduce congestion and stoppages.

Acceleration Override Subsystem

As discussed above, the manual control of the vehicle is overridden upon detection of various adverse conditions to reduce the acceleration and deceleration of the vehicle to compensate for such conditions.

Figure 9:
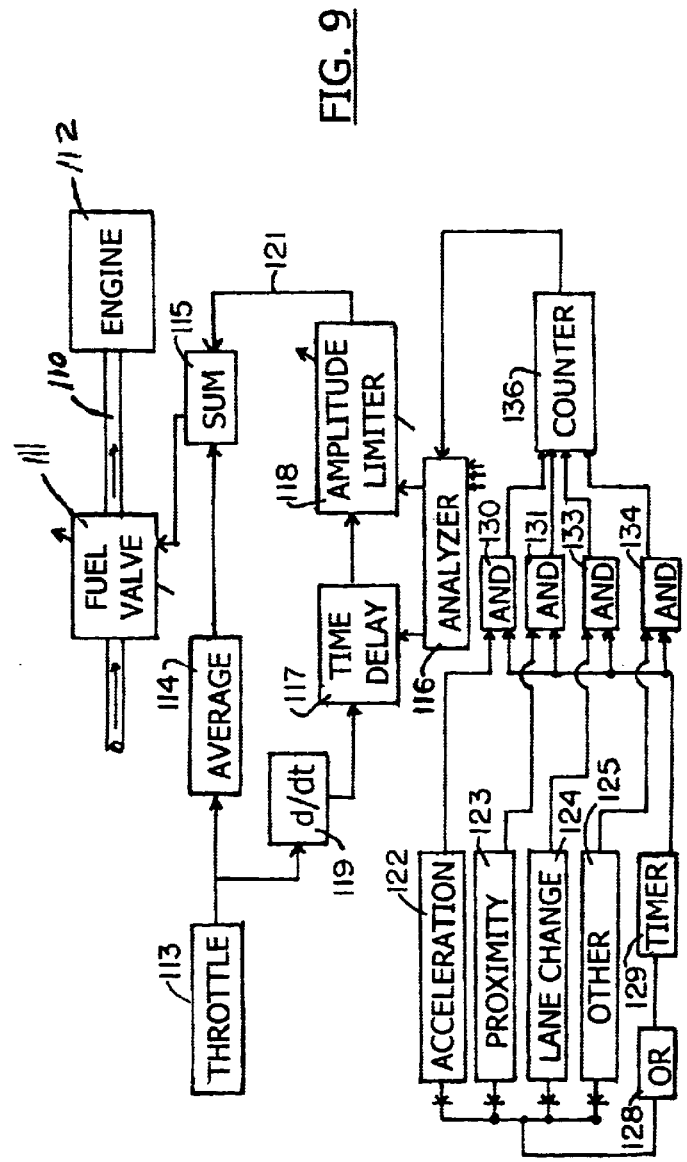
FIG. 9 is a block diagram of a system, according to the invention, for override of manual control of the vehicle upon detecting adverse conditions.

FIG. 9 illustrates one preferred embodiment for performing such overriding control of the acceleration or deceleration of the vehicle. As shown, the vehicle engine 112 receives fuel over fuel line 110 through an adjustable regulating fuel control valve 111 that is actuated in response to the driver's operation of the throttle control or pedal on the vehicle. As the throttle is increased to accelerate the vehicle, the fuel valve 111 normally passes more fuel to the engine to promptly comply with this command. In the embodiment of FIG. 9, the throttle generated signal is divided into two components; the first directed to an averaging circuit 114, and the second to a differentiating circuit 119. The first component is directed to the fuel control valve 111 to maintain the vehicle speed at its preexisting speed (e.g. average), after passing through a sum circuit 115. The second component, representing the change in speed or acceleration requested by the driver of the vehicle, also is directed to the fuel control valve 111 after first passing through an adjustable time delay circuit 117 and an amplitude divider circuit 118. Where the onboard sensors on the vehicle do not detect any violation of the traffic laws or any adverse condition, the analyzer 116 does not cause any time delay to be imposed by time delay circuit 117 nor any amplitude changes to be imposed by amplitude divider circuit 118. Accordingly the acceleration component is directed without change to the sum circuit 115 where it is added to the preexisting speed signal, thereby to compel the vehicle to accelerate to the extent required. However, in the event that the onboard sensors detect a condition requiring override of the vehicle's manual controls, the time delay circuit 117 is proportionally modified by the analyzer 116 to time delay the second component, and the amplitude divider circuit 118 is also proportionally adjusted by the analyzer circuit 116 to modify the amplitude of the second component of the throttle signal. Accordingly, the second component of the throttle signal is variably time delayed and also reduced in amplitude to reduce the rate of acceleration of the vehicle and also time delay the application of the manual throttle commands from the vehicle driver. These changes occur during both acceleration and deceleration of the vehicle to override the manually directed control and automatically impose limitations on the vehicle performance to overcome the detected adverse conditions.

Proximity Signaling

As discussed above and illustrated in FIG. 1, various of the onboard sensors detect the proximity of other vehicles and objects and control the vehicle to prevent traffic crashes and collisions. According to the invention, the detected proximity of such objects may also be signaled to the driver of the vehicle, to alert and warn the driver of such danger(s). Referring to FIG. 1, the various sensors 41 to 46, inclusive, detect the presence of vehicles and objects, and signals are generated by the sensors at 36 to 39, inclusive, (FIG. 1) to energize the analyzer 12. The signals may also be individually directed to a display indicator 39a onboard of the vehicle and convenient to the vision of the driver. These signals may also be directed to operate an audible signaling device, such as an onboard beeper, thereby to repeat a beeping signal to warn the driver. After hearing the beeping sounds the driver may then observe the onboard display screen 39a to determine the location of the detected vehicle or object with respect to his vehicle.

Reckless Driving

Reckless driving involves driving a vehicle in a manner that disregards the safety of others as well as the safety of the driver involved. Reckless drivers abruptly accelerate and decelerate without warning or signaling others, they tailgate other vehicles, often change lanes without warning, cut off other drivers at intersections and when changing lanes, and otherwise operate their vehicles in a manner that is dangerous to others. According to the present invention, such reckless driving is detected and monitored by onboard sensors described above, to override the manual operation of the vehicle to the extent of reducing its acceleration response to the operation of the manually controlled throttle of the vehicle, thereby changing the performance of the vehicle to inhibiting the continuation of driving in a reckless manner.

Referring again to FIG. 9, the onboard sensors 122, 123, 124, and 125 etc. detect the various movements of the vehicle including its acceleration, tailgating (proximity), lane changing, and other movements. In response to any of the detected movements, the detecting sensor energizes an OR circuit 128 to trigger a fixed timer 129 into operation. The operated timer 129, in turn, energizes each of the AND circuits 130, 131, 133, and 134 for the fixed period of time following each timer operation. During each period of operation of the timer 129, the signal(s) generated by any one or more of the onboard sensors 122 to 125 is passed through its related AND circuit to an accumulating counter 136 to be added to any other signals received from any of the onboard sensors during that measured fixed time period of the timer 129. In the event that the counter 136 accumulates a preestablished number of such signals from the various sensors, indicating an excessive number of consecutive movements of the vehicle (e.g. an excessive number of lane changes, accelerations, etc. within the timed period), the subsystem recognizes that the vehicle is being driven recklessly, and a control signal is generated over line 121 to the subsystem analyzer 119. Thus the counter 136 sums the number of various vehicle movements that occur during each fixed time period of the timer 129, and upon determining that the number is excessive and indicative of reckless driving, a control signal is direct over line 121 to the analyzer 119 to override the manual control of the vehicle and changes its acceleration response to the manual operation of the throttle pedal 113.

As discussed above, the analyzer 116 variably regulates (increases) the time delay provided by circuit 117 and also variably reduces the amplitude of the signal component passed by amplitude limited circuit 118. Thus any subsequent change in the throttle 113 to accelerate the vehicle is both time delayed and reduced in amplitude, rendering the vehicle operation more slow in response to manual commands, and also reducing the acceleration of the vehicle for any increased throttle.

After each fixed time period of operation of the timer 129, the subsystem is reset to permit the "normal" manually controlled operation of the vehicle to resume. However, upon detecting any subsequently detected movement of the vehicle, the timer 129 is restarted to assist in monitoring the future operation of the vehicle during this next time period. Thus the vehicle is continually monitored from period to period to determine if it is being operated recklessly. Whenever reckless driving is detected to occur, the manually controlled operation of the vehicle is overridden to inhibit continuation of such reckless driving of the vehicle.

Variations

Many changes may be made by those skilled in the fields of electronic controls for vehicles without departing from the scope of the present invention. Many different kinds and types of onboard sensors are presently available for detecting various movements of vehicles, as well as conditions of the surrounding environment, including the traction provided by the roadways. These available sensors include both active and passive types, and operate in different frequency ranges including the infra-red bands and visible laser beams. The electronic subsystems disclosed may employ hardware, software, and combinations thereof as is presently customary in many control systems in use today for various other functions. The described subsystems may be modified to use additional sensors to detect other conditions affecting the vehicles, or in a modified subsystem, use fewer sensors. For example, wind speed, external temperature, flooding and other conditions affecting the vehicles and their operations may be sensed and monitored. Since these and other changes may be made without departing from the scope of this invention, this invention should be considered as being limited only by the following claims.

What is claimed is:

1. An automatic system for a manually controlled, steerable automotive vehicle that responds to adverse weather conditions to limit the vehicle speed and acceleration to inhibit skidding or other instability of the vehicle during such adverse weather, while enabling other manually controlled functions to be performed including steering and stopping of the vehicle, said automatic system comprising:

a controller adapted to be connected to the vehicle for regulating the maximum speed and acceleration of the vehicle exclusively of any manual control but unaffectibg the manually controlled steering or stopping of the vehicle, sensor means for detecting adverse weather conditions externally of the vehicle, said adverse weather conditions including one of iceing, sleet, snow, rain, and impaired visibility external of the vehicle, said sensor means energizing said controller to proportionally limit the vehicle speed and acceleration responsively to detecton of said adverse weather conditions thereby to automatically assist in safe operation of the vehicle during said adverse weather condition, said automatic system being independent of any attempted manual override of the limit of vehicle speed and acceleration during said adverse weather conditions.

2. In the automatic system of claim 1, said controller including a time delay means for time delaying any manually controlled changes in speed and acceleration during periods of adverse weather conditions.

3. In the automatic system of claim 1, The addition of further sensor means for continually detecting traffic regulations as the vehicle proceeds, and also concurrently monitoring the existing movements of the vehicle, said additional sensor means energizing said controller when traffic regulations have been violated, thereby to automatically control the speed and movement of the vehicle to comply with said traffic regulations.

4. A safety control system for automotive vehicles operated by a driver, said system automatically responding to adverse weather conditions that may result in slippery roads and impaired vision by the driver, said system being coupleable to the vehicle speed and acceleration controls to override manual control of the speed and acceleration of the vehicle to automatically adjust the speed and permissible acceleration of the vehicle to compensate for said adverse weather conditions, thereby to promote safer driving of the vehicle, said system being free of controlling the steering of the vehicle whereby the driver is able to manually steer the vehicle and is free to manually control the stopping of the vehicle but is unable to overcome the speed and acceleration that has been automatically imposed by the system, sensor means onboard of the vehicle for detecting adverse weather conditions resulting in slippery roads with reduced traction of the vehicle, said sensor means additionally detecting adverse weather conditions that result in impaired vision of the driver to observe the road ahead of the vehicle, a controller coupleable to the vehicle to regulate the speed of the vehicle and the ability of the vehicle to accelerate, said controller being energized by said sensor means and responsive to said sensor means detecting adverse weather conditions to automatically override manual control of the vehicle by the driver and regulate the speed of the vehicle and its ability to accelerate in proportion to the extent of adverse weather conditions detected by said sensor means, whereby upon detection of adverse weather conditions, the system regulates the extent of speed and acceleration of the vehicle exclusive of manually controlled efforts of the driver to do so yet permits the driver to continue steering of the vehicle and permits the driver to bring the vehicle to a stop.

5. In the control system of claim 4, said controller including a time delay means to delay any manually initiated changes in speed or acceleration of the vehicle by the driver after detection of said adverse weather condition by said sensor means.

6. In the control system of claim 4, sensor means additionally detecting restrictive traffic regulations and concurrently detecting the existing speed and movement of the vehicle, and said controller responding to said detected traffic regulations and to said exisiting speed and movement of the vehicle to determine if a violation of said regulations has ocurred, and said controller responding to a detected violation of traffic regulations to control the speed and movement of the vehicle.

7. An automatic control system for manually controlled automotive vehicles operating to regulate the speed and acceleration of the vehicles during adverse weather conditions that may include one of icy roads, snow, sleet, rain, or fog, and wherein the system proportionately reduces the speed and acceleration according to the extent of the adverse weather conditions yet permits continued manually steering of the vehicle and manually controlled stopping of the vehicle as well as permitting other manually controlled functions to be continued other than the automatic regulation of speed and acceleration, and wherein the manual controls are unable to overcome the automatic control system during periods of adverse weather conditions, said system comprising:

a controller coupleable to the vehicle to regulate the extent of its speed and acceleration in response to command signals, sensor means for detecting said adverse weather conditions and in response thereto generating command signals energizing said controller, said vehicle having manually controlled steering, manually controlled speed and acceleration controls, and manually controlled braking, and said automatic control system permitting continued manually controlled steering, manually controlled stopping, and permitting other manually contolled functions of the vehicle to be performed during adverse weather conditions except for speed and acceleration regulation performed by the automatic control system whereby the regulated speed and regulated acceleration cannot be changed by the manual controls from those imposed by the automatic control system during periods of detected adverse weather conditions.

8. In the automatic control system of claim 7, said controller including a time delay means to delay any manually initiated changes in the speed or acceleration of the vehicle that may be manually initiated after detection of said adverse weather conditions by said sensor means.

9. In the automatic control system of claim 7, said sensor means additionally detecting restrictive traffic regulations and energizing said controller, and means concurrently energizing said controller according to the existing speed and movement of the vehicle to generate additional command signals, and said controller responding to said additional command signals to determine if a violation of said regulations has occurred, and responding thereto to regulate the speed and movement of the vehicle to comply with said regulations.

10. An automatic weather responsive control system for manually controlled automotive vehicles that automatically limits the speed and acceleration of the vehicle in response to adverse external weather conditions including road iceing, sleet, snow, rain, and fog; said automotive vehicle having manually operated controls for steering the vehicle, braking, and normally controlling its speed and acceleration, and wherein said weather responsive control system overrides said manual control of speed and acceleration and automatically regulates the speed and acceleration of the vehicle in response to adverse weather yet permits continued manual controls including steering and stopping of the vehicle but does not permit manual override of the vehicle automatic control system during periods of adverse weather conditions, said automatic system comprising:

onboard detecting means for sensing adverse weather conditions external of the vehicle that may result in vehicle skidding, loss of control, or inability to safely proceed, an onboard controller connectable to the vehicle and energized by said detecting means, said controller automatically regulating the speed and acceleration of the vehicle independantly of any manual control in response to the sensing of adverse weather conditions by said detecting means, whereby during periods of adverse weather conditions the vehicle speed and acceleration are under control of the automatic control system and cannot be modified by the vehicles manual controls, said controller enabling continued manual control of vehicle steering and stopping during periods of adverse weather conditions.

11. An automatic control system for a manually controlled vehicle to automatically override manual control of speed movements of the vehicle responsively to adverse weather conditions and violations of traffic laws, whereby during adverse weather conditions said system permits continued manual controlled steering of the vehicle and stopping of the vehicle, and whereby in response to violation of a traffic law, said system regulates the speed and movement of the vehicle to comply with said traffic law, and whereby during both of adverse weather or violation of a traffic law said system operates independently of manual control and prevents any attempted manual control from overriding the control system, said system comprising:

sensor means for detecting adverse weather conditions comprising one of icy roads, sleet, snow, rain, and fog, and generating an adverse weather signal, a controller coupleable to the vehicle and energized by said adverse weather signal to regulate the speed of the vehicle and its ability to accelerate, thereby to minimize vehicle skidding and loss of road traction, said contoller enabling continued manual control of steering and stopping of the vehicle during said period of adverse weather condition but preventing manually controlled override of the speed and acceleration of thye vehicle by the controller, said controller including a time delay means for delaying changes in speed and acceleration during periods of adverse weather, additional sensor means for detecting traffic laws and regulations as the vehicle proceeds, and energizing said controller with a traffic control signal, vehicle movement detecting means for energizing said controller according to the existing speed and movement of the vehicle, and said controller responding to said traffic control signal and to the existing speed and movement of the vehicle to regulate the speed and movement of the vehicle into compliance with the traffic law, the manual control of the vehicle speed and movement being disable after violation of a traffic law by said automatic control system.

\* \* \* \* \*